US006643019B1

(12) United States Patent
Jeanneret (10) Patent No.: US 6,643,019 B1
(45) Date of Patent: Nov. 4, 2003

(54) LASER ALIGNMENT DEVICE

(76) Inventor: Jack D. Jeanneret, 11600 N. Sheridan, Mead, WA (US) 99021

( * ) Notice: Subject to any disclaimer, the term of this patent is extended or adjusted under 35 U.S.C. 154(b) by 0 days.

(21) Appl. No.: 09/548,500

(22) Filed: Apr. 13, 2000

(51) Int. Cl.$^7$ .............................................. G01B 11/00
(52) U.S. Cl. ........................ 356/399; 33/286; 356/153
(58) Field of Search ................... 356/399, 248, 356/250, 153; 33/286

(56) References Cited

U.S. PATENT DOCUMENTS

| | | |
|---|---|---|
| 3,044,173 A | 7/1962 | O'Neal et al. |
| 3,068,573 A | 12/1962 | Sidwell |
| 4,233,748 A | 11/1980 | Ford et al. |
| 4,566,202 A * | 1/1986 | Hamar ........................ 33/286 |
| 5,365,669 A * | 11/1994 | Rustick et al. ................ 33/234 |
| 5,537,205 A | 7/1996 | Costa et al. |
| 5,568,265 A | 10/1996 | Matthews |
| 6,028,665 A * | 2/2000 | McQueen .................... 356/250 |
| 6,151,788 A * | 11/2000 | Cox et al. ...................... 33/286 |
| 6,286,219 B1 * | 9/2001 | Palumbo, II ................. 33/286 |

OTHER PUBLICATIONS

J–Tech Incorporated brochure; "Laser Plumbing Technology—The Future is Here!"; at least as early as Apr. 12, 2000; 2 pages.

* cited by examiner

*Primary Examiner*—Frank G. Font
*Assistant Examiner*—Layla Lauchman
(74) *Attorney, Agent, or Firm*—Wells, St. Jôhn, P.S.

(57) ABSTRACT

A laser alignment device is described in which a first pipe cap includes an open pipe receiving end formed about a central axis. A laser mount is provided on the first pipe cap, and a second pipe cap is releasably mounted to the first pipe cap. A mounting access is provided on the second pipe cap that is substantially coaxial with the central axis.

31 Claims, 6 Drawing Sheets

LASER ALIGNMENT DEVICE

TECHNICAL FIELD

The present invention relates to laser alignment and more particularly to laser alignment devices mounting a laser.

BACKGROUND OF THE INVENTION

Plumbers, electricians, and others in building and related trades often have a great deal of trouble aligning structure across distances. Transits have been used for this purpose, as have other measuring devices. However most measuring devices require substantial amounts of expensive labor and are susceptible to human error.

The advent of small, portable lasers have led to various construction related devices that mount the lasers for leveling and some aligning purposes. Such apparatus can improve various leveling and aligning tasks, but are either somewhat unreliable or include sensitive and expensive adjustment mechanisms that can be misadjusted or that require expensive labor to use.

The present invention has for an objective, provision of a laser alignment device that is extremely simple and easy to use, reduces the chance of human error, and which performs various otherwise time-consuming alignment tasks in a quick and efficient manner without requiring significant training or high labor costs.

The above and other objects and advantages may be realized from the following description of preferred forms of the invention which are illustrated in the accompanying drawings.

BRIEF DESCRIPTION OF THE DRAWINGS

Preferred embodiments of the invention are described below with reference to the following accompanying drawings.

FIG. 3 is an exploded perspective view;

FIG. 9 is a fragmented side elevation view showing a second preferred form of the device.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

General descriptions will be first given concerning several aspects of the present invention, followed by more detailed descriptions of preferred elements thereof.

In a first aspect of the present invention, a laser alignment device 10 includes a first pipe cap 12 including an open pipe receiving end 14 formed about a central axis X. A laser mount 16 is provided on the first pipe cap 12, and a second pipe cap 18 is releasably mounted to the first pipe cap 12. A mounting access 20 is provided on the second pipe cap 18 that is substantially coaxial with the central axis X.

Figure 5:
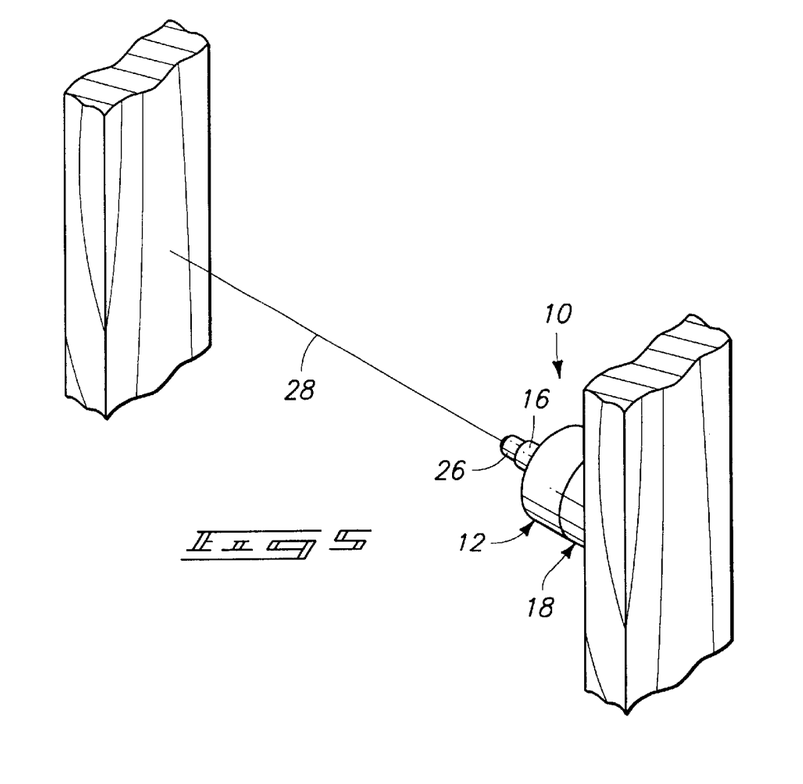
FIG. 5 is a perspective view showing the device in operation between studs.

In another aspect, the laser alignment device 10 comprises the first pipe cap 12 including closed end 22 and an open pipe receiving end 14 formed about the central axis X. The laser mount 16 is provided in fixed position on the closed end 22, coaxial with the central axis X. A laser 26 is mounted to the laser mount, and is operable to produce a light beam 28 (see FIGS. 5 and 8) that is coaxial with the central axis. A reducer sleeve 30 is slidably received in the open pipe receiving end 14 of the first pipe cap 12, and the second pipe cap 18 has a base end 32 and an open collar 34 that is slidably received over the reducer sleeve 30. The mounting access 20 is provided on the second pipe cap 18.

In a further aspect, the laser alignment device 10 is comprised of the first pipe cap 12 which includes a substantially closed end 12 and the open pipe receiving end 14 formed about the central axis X, with the open end 14 being defined by a pipe receiving collar 36. The laser mount 16 is provided in fixed position on the first pipe cap 12, and the reducer sleeve 30 is slidably received within the pipe receiving collar 36 of the first pipe cap 12. The second pipe cap 18 includes base end 32 and open collar 34 which is slidably received over the reducer sleeve 30. The stud mounting access 20 is provided on the second pipe cap 18.

Referring now in greater detail to preferred elements of the device, attention is firstly drawn to the first pipe cap 12. As shown in FIGS. 1–4 and 9, the preferred first pipe cap 12. is formed in a cup shape, with the closed end 22 formed across the collar 36 which is tubular. The closed end and collar are preferably integral, and are formed of plastic by injection molding or another appropriate forming process.

An internal surface 38 of the collar 36 is preferably circular in cross section, and includes a diameter that is slightly greater than a standard pipe size commonly used in construction. In fact, the present device may be produced with a collar 36 having approximately the same internal diameter as a selected standard pipe cap or coupling, to allow the first pipe cap 12 to slide over a pipe end. Also, the standard internal diameter will accept various conventional pipe adapters that will allow use of the present device 10 on other pipe diameters.

The open pipe receiving end 14 is preferably formed substantially perpendicular to the axis X. The open end 14 may thus be used to orient the device with the axis X in substantial perpendicularity to a support surface. For example, the open end 14 may be rested against a floor or other support surface, and the laser will be automatically oriented substantially perpendicular to that surface.

The closed end 22 of the first pipe cap 12 is preferably integral with the collar 36. The end 22 spans the otherwise open collar 36 to provide a fixed, integral base for the laser mount 16. It is preferred that the laser mount be integral and in fixed orientation on the first pipe cap 12, to eliminate any need for the user to make angular adjustments to the laser. The laser mount will thus be produced in fixed position, preferably centered on the central axis X, and oriented to receive and mount the laser 26 so the beam produced by the laser is substantially coaxial with the central axis X and substantially perpendicular to the base end 32 of the second pipe cap 18.

In preferred forms, the mount 16 is tubular and is shaped to slidably receive a conventional battery operated laser 26. A laser 26 selected from many that are currently marketed as pointers, such as the class IIIA variety, operating at approximately 5 milliwatts and between approximately 630–650 nanometers, for emitting a light beam and producing an illuminated spot on a selected object. It is preferable that the selected laser 26 include a body that is elongated and formed about an axis that is substantially coaxial with the beam it produces. The beam will thus be substantially coaxial with the axis X when the laser is mounted to the device.

The internal shape of the mount may be produced to accept, by way of a sliding friction fit, a selected commercially available laser 26. The laser body can therefor be simply slid into place within the mount 16 and be removed later for replacement, maintenance or repair. Alternatively, the laser may be secured by adhesive, by interference or shrink fit, or, less preferably, by mechanical fasteners.

It is preferred that the laser body be substantially cylindrical. However, as indicated, the mount 16 may be produced. to accept other laser body shapes such as but not limited to octagonal, hexagonal, elliptical or other configuration.

Figure 4:
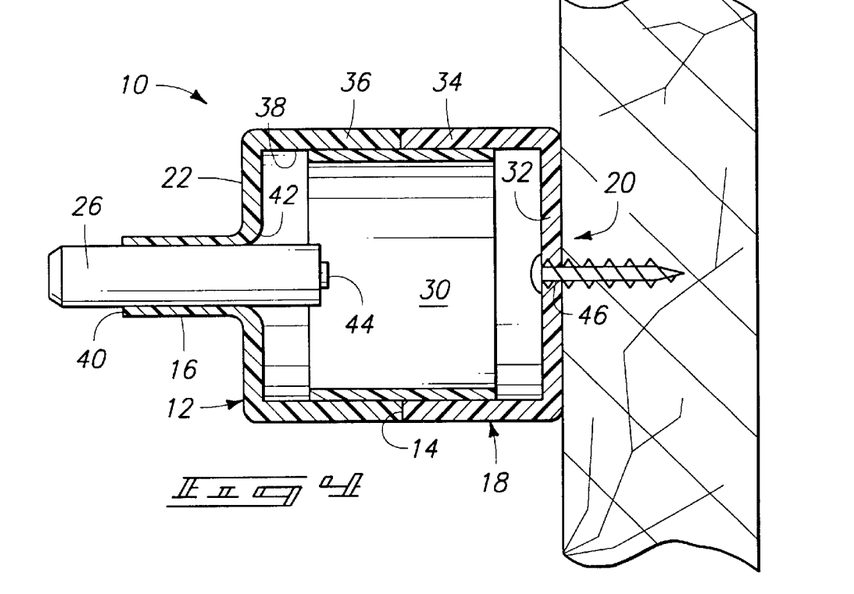
FIG. 4 is a sectioned view showing the device mounted to a stud.

It is also preferable that the laser mount 16 include opposed open ends 40, 42 to accept the laser 26. The open ends 40, 42 will permit the laser to be positioned lengthwise in the mount. The rearward open end 42 will permit access to the laser 26 from within the first pipe cap 12, should the laser 26 be selected with, or adapted to include a rearward operating on-off switch 44 as shown by FIG. 4.

The second pipe cap 18 may be of similar construction as the first pipe cap 12, but without the laser mount. Thus, the second pipe cap 18 may include the base end 32, and collar 34 that are generally similar to the first pipe cap 12 closed end 22 (without the laser mount) and the collar 36.

In the form illustrated in FIG. 9, however, a collar 34a is sized to be slidably fit within the first pipe cap collar 36, thus eliminating the need for a reducer sleeve 30. The collar 34a may be sized with an internal cross-sectional configuration to be received over complimentary sized pipe ends. Thus the second cap of the FIG. 9 configuration may be reversed from the position shown in FIG. 9 to form a configuration similar to that shown in FIG. 7, so the outside surface of the collar 34a will be readily received in a female pipe fitting of complimentary size. Further, the inside wall surface of collar 34a may be of a selected standard dimension to be slidably received over a complimentary standard dimension male pipe or fitting end.

The second pipe cap 18 is provided with the mounting access 20. In an illustrated example of a preferred form, the access 20 is provided as a hole 46 formed through the base end 32. In another exemplary form, the access 20 may be provided as a surface 52 for attachment of a securing device which, for example, may be a magnet 50 (FIG. 9) that will permit attachment of the device to metallic support surfaces. In the illustrated example, the surface 52 is formed as a recess in the second cap base end 32. The device may be produced with the surface 52 and the hole 46 together, allowing an option of mounting capabilities. Alternatively, either surface 52 or hole 46 may be provided separately. That is, a second pipe cap 18 may be produced with the hole 46 and no surface 52, or with the surface 52 and no hole 46.

Still other forms of access 20 may be provided such as pressure sensitive adhesives or hook and loop fasteners that could be used in place of the magnet. Integral tack or screw points could be formed in or fitted to the second pipe cap 18 and project from the base end 32 for attachment to a support surface, thereby eliminating the need for a separate screw or nail to be fitted through the hole 46.

Of the above alternatives, access 20 in the form of hole 46 is most preferable at present. The hole 46 is advantageously situated along and centered on the central axis X, and may be shaped to receive a standard fastener such as a screw or nail. The hole 46 may also be used to visually align the second pipe cap 18 with a mark on the surface of a stud, floor surface, joist, electrical panel, duct work, rafter, or any other preferably flat support surface that will provide adequate support for the device.

Figure 1:
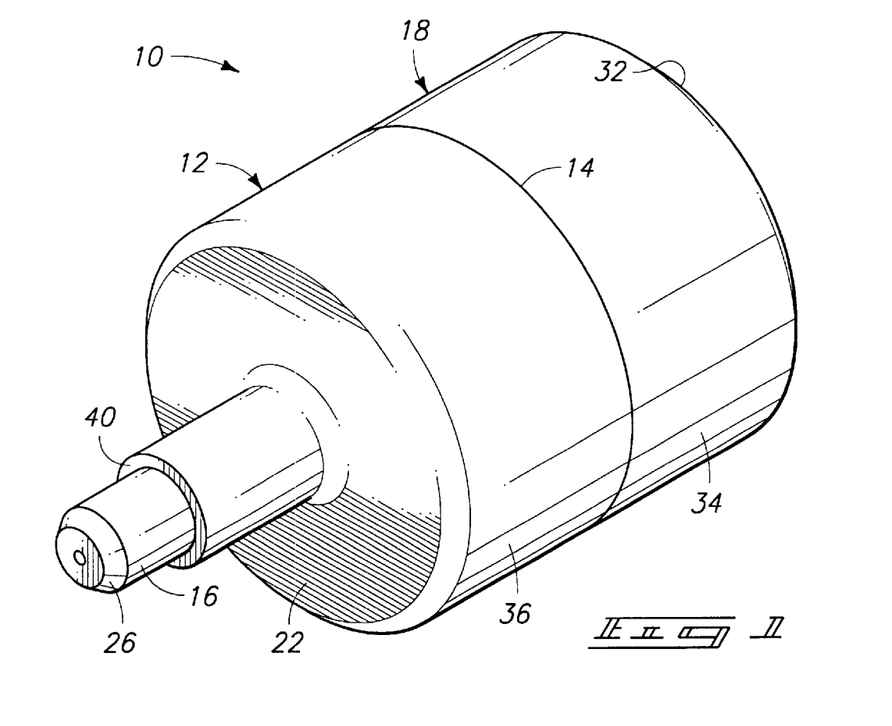
FIG. 1 is a perspective view of a first preferred form of my laser alignment device.
Figure 2:
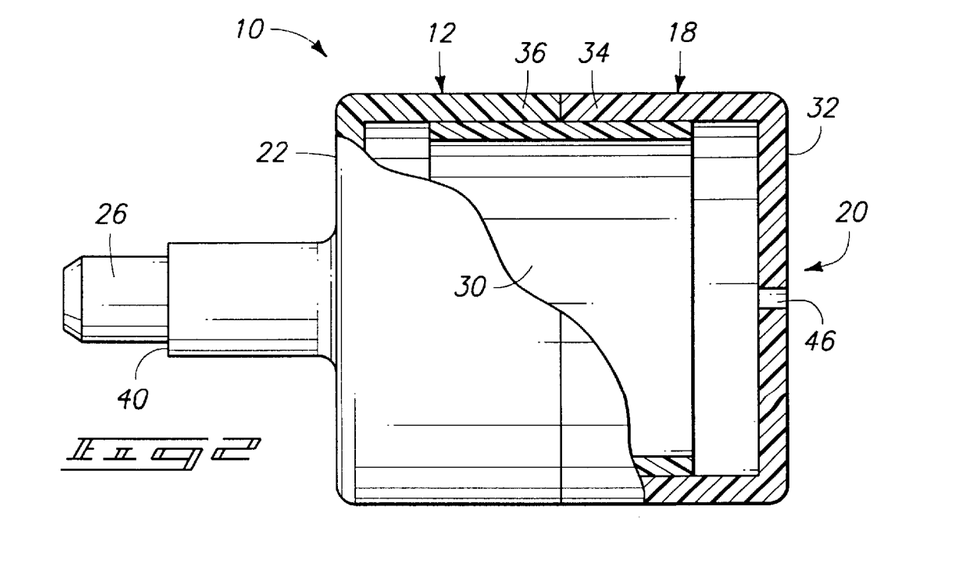
FIG. 2 is a fragmented side elevation view thereof.
Figure 6:
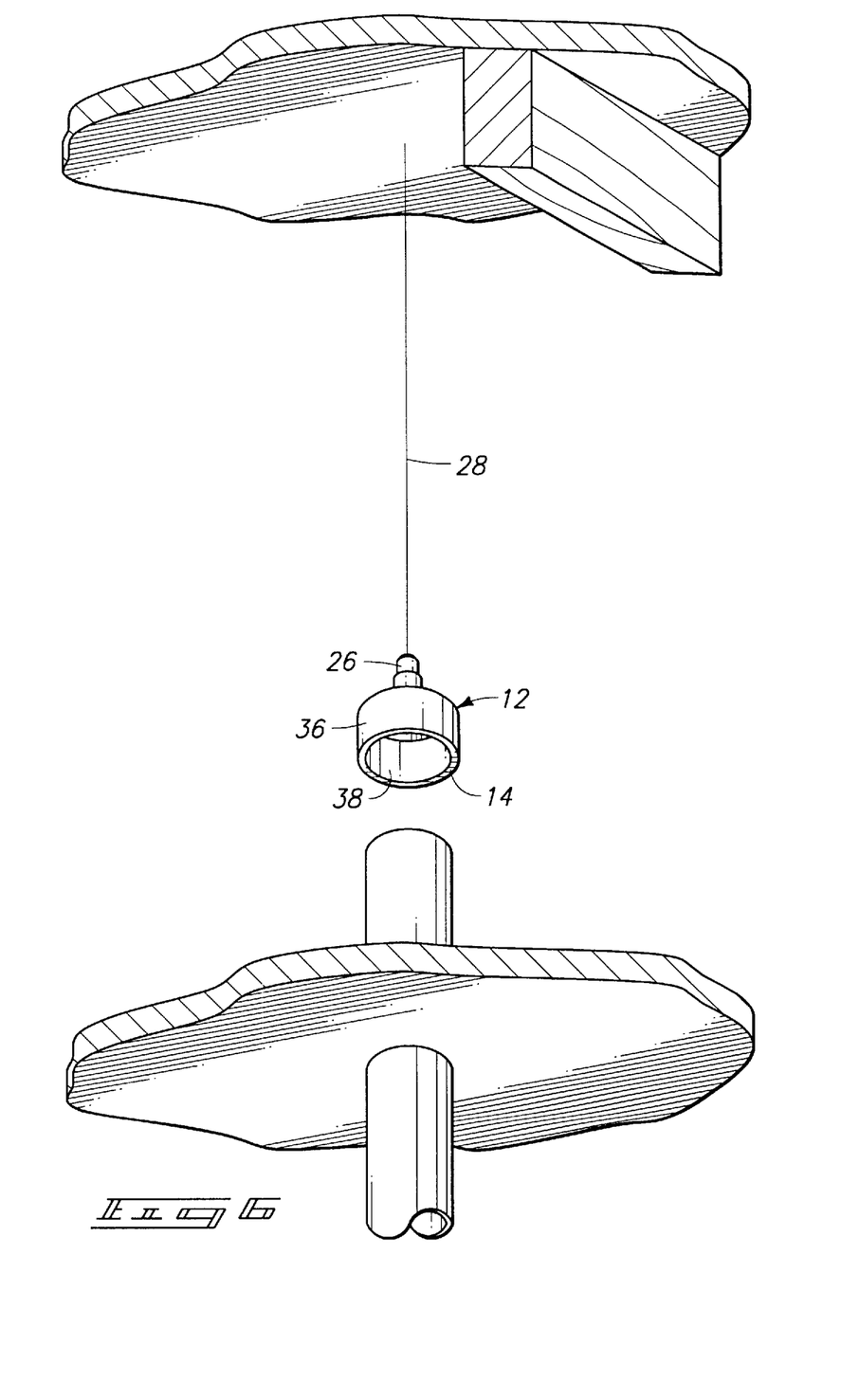
FIG. 6 is a perspective exploded view showing installation of the present device on a pipe and operation to situate a point on an adjacent structural member.
Figure 7:
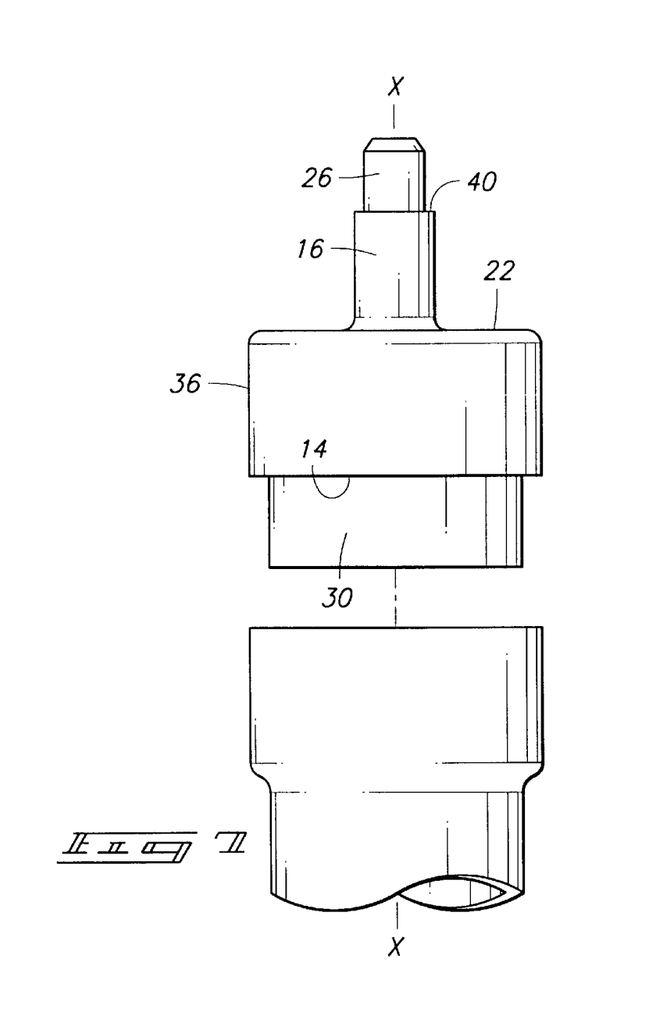
FIG. 7 is a side elevation exploded view showing the device and reducer being used to fit onto the end of a pipe.

The reducer sleeve 30, shown in the embodiments illustrated in FIGS. 2 and 4, is used to connect the first and second pipe cap 12, 18 together in coaxial relation. The sleeve can also be used, as shown in FIG. 7, as a male fitting to allow mounting of the device 10 in a female pipe coupling. It is preferable that the sleeve be removable to permit use of the device in the mode illustrated in FIG. 6 where the first pipe cap 12 is shown ready for placement on a male pipe end. The sleeve 30 thus allows for storage of the component parts of the device, and further extends use on different pipe sizes.

Opposed ends of the reducer sleeve are preferably perpendicular to the axis X. The perpendicular ends help to angularly orient the first and second caps in a substantial coaxial relationship, by engagement with internal surfaces within the first and second pipe end caps 12, 18. Further, the sleeve end that is exposed once the second pipe cap 18 is removed, is substantially perpendicular to the axis X, and can be used to rest against or abut with a support surface to hold the laser and beam substantially perpendicular to the support surface.

Figure 8:
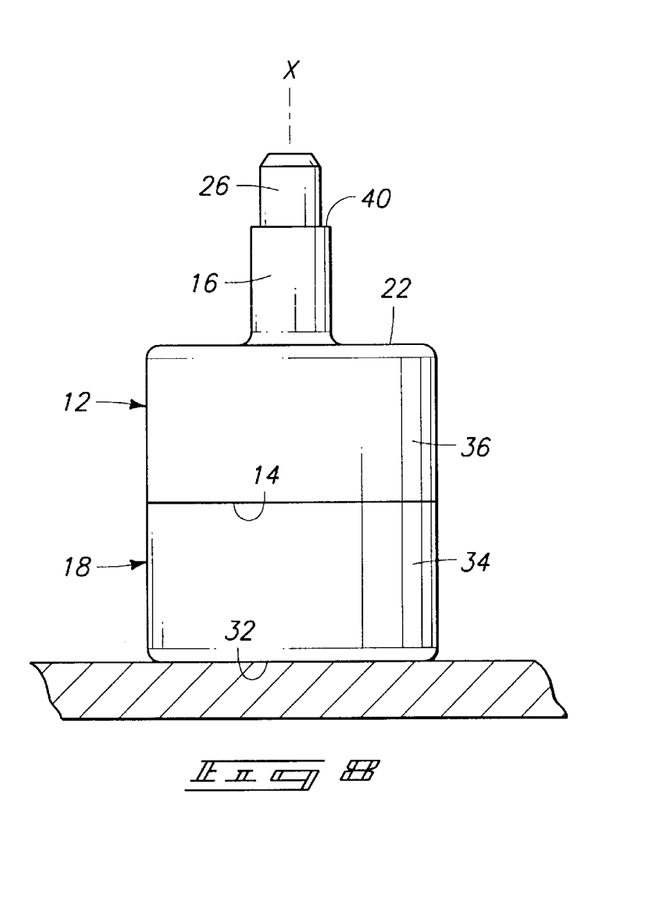
FIG. 8 is a view showing the device resting on a floor surface.

It is noted that the base end 32 of the second cap 18 is flat and is substantially perpendicular to the central axis X. By this arrangement, the device may be mounted to a stud as shown in FIG. 4, or be simply placed on a support surface as shown in FIG. 8. In either arrangement, the beam produced by the laser 26 will be substantially perpendicular to the associated support surface. Further, by reason of the central location of the access 20 the beam may be centered with respect to a selected mounting point for the device.

Operation of the present invention may vary according to the selected need of the operator. An electrician, for example, who would like to align a number of holes along successive studs (see FIGS. 4 and 5) for receiving conduit or wiring, or a plumber needing similar holes for piping may make use of the present alignment device. To align successive marks for drilling, the user simply selects a stud and marks the desired starting point.

Next the second pipe cap 18 is removed from the remaining parts of the device and is attached by a screw or nail through the mounting hole 46. The tip of the screw or nail is placed on the previously made mark. The base end 32 is drawn by the nail or screw into flush engagement with the stud, so the central axis will now pass through the mark and be perpendicular to the stud.

The laser switch 44 is now operated to activate the laser and the first pipe cap 12 is fitted to the second cap (by way of the reducer sleeve 30, if provided) so the beam 28 will now be coaxial with the central axis. The point of light will be visible on the next adjacent stud, indicating the drilling point. The hole is drilled and the light will pass through the hole to the next stud and produce a mark for drilling. The process is repeated at successive studs and the result is an aligned set of holes that will readily accept a conduit, pipe, or wiring with only one set of measurements required. Of course, the above use may be adapted for other construction tasks as well.

If a carpenter or plumber needs to mark a ceiling or roof for a hole in alignment with an existing pipe, the device may again be readily and easily used. The user simply removes the second pipe cap 18 and exposes either the reducer sleeve 30 (to be fitted within a female pipe fitting (FIG. 7), or removes the reducer sleeve 30 to allow the first pipe cap 12 to be fitted over a male pipe end (FIG. 6). Alternatively, standard and readily commercially available pipe fittings can be used with either the reducer sleeve 30 or first pipe cap 12 to fit pipe or fitting ends that do not match the reducer sleeve or first pipe cap 12. The laser is then activated and the device is fitted to the pipe end. The central axis will now be substantially coaxial with the pipe end and the light will indicate a drilling point on the desired surface.

In the alternate version shown in FIG. 9, the first pipe cap 12 may be used as indicated above. However, instead of a reducer sleeve, the second pipe cap 18 is provided (with its open collar 34 being sized similar to the reducer sleeve). For a reduced size fitting over a pipe end, the second pipe cap 18 may simply be removed, then reversed and refitted base end first into the first pipe cap 12 to present a male collar surface for reception within a female pipe fitting, or a female surface that will slidably receive the end of an appropriately sized male pipe end.

If, for example, a finish carpenter or electrician needs to locate a point, say in the center of a room and on an inclined cathedral ceiling for mounting a light fixture, the device 10 may again be used to advantage. Measurements are simply taken along the floor of the room to determine the room center. Now the laser is activated and the device is simply placed on the floor (see FIG. 8) at the center mark. The light beam (being perpendicular to the floor) will project the room center upwardly by way of the light beam, indicating the center point along the cathedral ceiling for mounting the light fixture.

The above examples are only several of many uses that may be found for the present device 10. Carpenters, electricians, pipe fitters, plumbers, sheet metal workers, and others may find many other beneficial uses for the present device.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A laser alignment device, comprising
   a first pipe cap including an open pipe receiving end formed about a central axis;
   a laser mount on the first pipe cap;
   a second pipe cap releasably mounted to the first pipe cap; and
   a mounting access on the second pipe cap and substantially coaxial with the central axis.

2. A laser alignment device, as defined by claim 1, further comprising a reducer sleeve releasably joining the first and second pipe caps.

3. A laser alignment device, as defined by claim 1, further comprising a reducer sleeve releasably joining the first and second pipe caps and wherein the reducer sleeve is removable from both first and second pipe caps.

4. A laser alignment device, as defined by claim 1, wherein the second pipe cap includes a base end and wherein the mounting access is formed on the base end of the second pipe cap.

5. A laser alignment device, as defined by claim 1, wherein the mounting access is formed as a hole formed through the base end of the second pipe cap.

6. A laser alignment device, as defined by claim 1, wherein the mounting access is formed as a hole formed through the base end of the second pipe cap and wherein the hole is substantially centered on the central axis.

7. A laser alignment device, as defined by claim 1, wherein the second pipe cap is slidably mounted to the first pipe cap.

8. A laser alignment device, as defined by claim 1, wherein the base includes a mounting surface that is substantially perpendicular to the central axis.

9. A laser alignment device, comprising:
   a first pipe cap including closed end and an open pipe receiving end formed about a central axis;
   a laser mount in fixed position on the closed end, substantially coaxial with the central axis;
   a laser mounted to the laser mount, and operable to produce a light beam that is substantially coaxial with the central axis;
   a reducer sleeve slidably received in the open pipe receiving end of the first pipe cap;
   a second pipe cap having a base end and an open collar slidably received over the reducer sleeve; and
   a mounting access on the second pipe cap.

10. A laser alignment device, as defined by claim 9, wherein the base is substantially perpendicular to the central axis.

11. A laser alignment device, as defined by claim 9, wherein the mounting access is comprised of a hole formed through the base.

12. A laser alignment device, as defined by claim 9, wherein the reducer sleeve is removably mounted to the first and second pipe caps.

13. A laser alignment device, as defined by claim 9, wherein the laser mount is integral with the first pipe cap.

14. A laser alignment device, as defined by claim 9, further comprising an on-off switch on the laser disposed within the open pipe receiving end of the first pipe cap.

15. A laser alignment device, comprising:
   a first pipe cap including a substantially closed end and an open pipe receiving end formed about a central axis, the open end being defined by a pipe receiving collar;
   a laser mount in fixed position on the first pipe cap and shaped to receive and fixedly support a laser in a selected angular orientation;
   a reducer sleeve slidably received within the pipe receiving collar of the first pipe cap;
   a second pipe cap having a base end and an open collar slidably received over the reducer sleeve; and
   a mounting access on the second pipe cap.

16. A laser alignment device, as defined by claim 15, wherein the mounting access is defined by a hole formed through the base end of the second pipe cap.

17. A laser alignment device, as defined by claim 15, wherein the first and second pipe caps are formed of plastic and wherein the open collars are dimensioned to slidably receive plumbing pipe ends.

18. A laser alignment device, as defined by claim 15, wherein the laser mount is comprised of an open laser receiving sleeve on the first pipe cap.

19. A laser alignment device, as defined by claim 15, wherein the laser mount is comprised of a laser receiving sleeve on the first pipe cap that is coaxial with the central axis and open at opposed ends.

20. A laser alignment device, as defined by claim 15, wherein the base of the second pipe cap is flat and substantially perpendicular to the central axis.

21. A laser alignment device, as defined by claim 1, wherein the first pipe cap defines a periphery, and the first pipe cap is configured to receive a portion of an external structure within the periphery for mounting the laser alignment device to the external structure.

22. A laser alignment device, as defined by claim 1, wherein the open pipe receiving end of the first pipe cap is configured to receive a pipe.

23. A laser alignment device, as defined by claim 1, wherein the mounting access is configured to provide mounting of the laser alignment device to a structure external of the laser alignment device.

24. A laser alignment device, as defined by claim 9, wherein the first pipe cap defines a periphery, and the first pipe cap is configured to receive a portion of an external structure within the periphery for mounting the laser alignment device to the external structure.

25. A laser alignment device, as defined by claim 9, wherein the open pipe receiving end of the first pipe cap is configured to receive a pipe.

26. A laser alignment device, as defined by claim 25, wherein the reducer sleeve is configured to receive an other pipe.

27. A laser alignment device, as defined by claim 9, wherein the mounting access is configured to provide mounting of the laser alignment device to a structure external of the laser alignment device.

28. A laser alignment device, as defined by claim 15, wherein the first pipe cap defines a periphery, and the first pipe cap is configured to receive a portion of an external structure within the periphery for mounting the laser alignment device to the external structure.

29. A laser alignment device, as defined by claim 15, wherein the open pipe receiving end of the first pipe cap is configured to receive a pipe.

30. A laser alignment device, as defined by claim 15, wherein the reducer sleeve is configured to receive a pipe.

31. A laser alignment device, as defined by claim 15, wherein the mounting access is configured to provide mounting of the laser alignment device to a structure external of the laser alignment device.

* * * * *